(12) United States Patent
Sichi et al.

(10) Patent No.: US 7,771,141 B2
(45) Date of Patent: Aug. 10, 2010

(54) MILLING TOOL FOR ROUGHING WORKPIECES

(75) Inventors: Tiziano Sichi, Luterbach (CH); Josef Maushart, Solothurn (CH)

(73) Assignee: Fraisa Holding AG, Bellach (CH)

( * ) Notice: Subject to any disclaimer, the term of this patent is extended or adjusted under 35 U.S.C. 154(b) by 0 days.

(21) Appl. No.: 11/585,676

(22) Filed: Oct. 24, 2006

(65) Prior Publication Data

US 2007/0122241 A1    May 31, 2007

(30) Foreign Application Priority Data

Oct. 24, 2005   (EP)   ................. 05109903

(51) Int. Cl.
  *B23C 1/10*   (2006.01)
  *B23C 5/10*   (2006.01)
(52) U.S. Cl. .......................... 407/53; 407/63
(58) Field of Classification Search ................. 407/53, 407/30, 63, 60, 54, 61, 62
  See application file for complete search history.

(56) References Cited

U.S. PATENT DOCUMENTS 4,560,308 A * 12/1985 Deller .......................... 407/53

2005/0025584 A1   2/2005 Kolker et al.

FOREIGN PATENT DOCUMENTS

| DE | 202004015757 U1 | 8/2005 |
| JP | 9-29530 | 2/1997 |
| WO | WO 03/039797 A2 | 5/2003 |

* cited by examiner

*Primary Examiner*—Will Fridie, Jr.
(74) *Attorney, Agent, or Firm*—Seed Intellectual Property Law Group PLLC

(57) ABSTRACT

A milling tool for roughing workpieces is provided with a plurality of cutting flanks and flutes disposed in between. The cutting flanks are provided on the cutting side with a predetermined rake angle, and the cutting edges have moreover a profile of wave form that extends over the width of the cutting flanks. The profile of wave form is provided with a bevel having a width corresponding to at least the height of the crest, and having a wedge angle that is more obtuse than the wedge angle of the milling tool. When the tool is subjected to heavy operational demands, a chipping or breaking off of the crest edges is thereby prevented, thus increasing the service life of the tool.

16 Claims, 3 Drawing Sheets

US 7,771,141 B2

MILLING TOOL FOR ROUGHING WORKPIECES

BACKGROUND OF THE INVENTION

1. Field of the Invention

Figure 1:
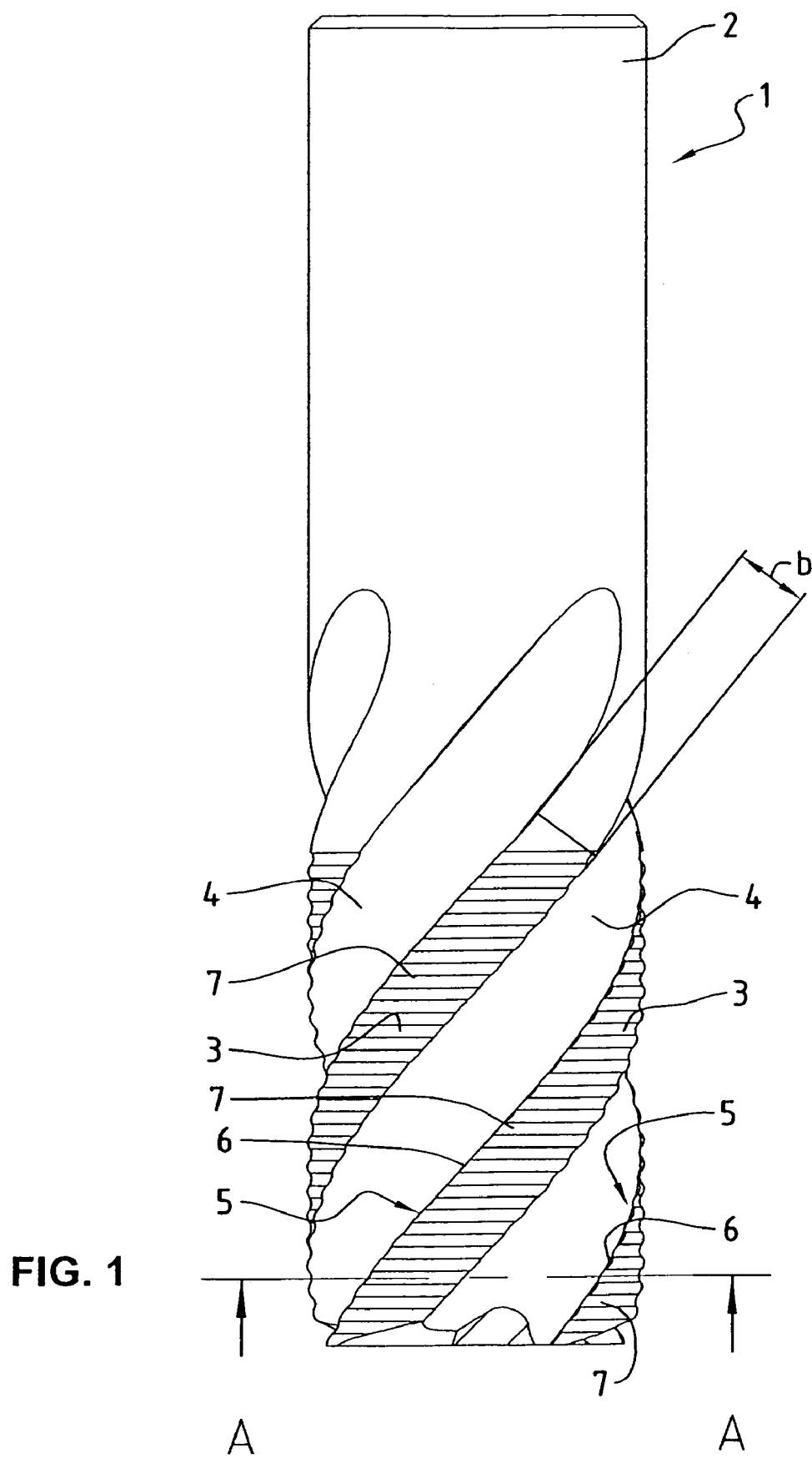

This invention relates to milling tools for roughing workpieces, and more specifically to a milling tool which is provided with a plurality of cutting flanks and flutes disposed in between, which cutting flanks are provided on the cutting side with cutting edges having a predetermined rake angle, and the cutting edges have a profile of wave form that extends over the width of the cutting flanks and is provided with a bevel in the region of the cutting edge.

2. Description of the Related Art

In particular in HPC (High Performance Cutting) technology, the aim is to maximize the material removal rate, and thereby reduce the manufacturing costs for the workpieces, and increase productivity. To this end, milling tools are used which are made of carbide, which material is relatively brittle. High-alloyed HSS tools are also used. Owing to the brittleness of the materials, there is the risk that, when machining tough materials, a chipping off of the crest edges occurs, greatly lowering the rate of production of the corresponding workpieces. Thus wear and tear on milling tools of this kind is relatively high.

According to the German utility model DE-GM 20 2004 015 757, measures are taken to eliminate this chipping of the crests of the cutting edge. These measures consist in a cutting profile being ground which is accomplished in each case up to the cutting edge delimiting the chip space. Achieved in this way is that the attrition is less. These measures have the drawback, however, that they must be applied in a relatively involved and therefore costly way.

In the Japanese patent publication No. 09029530, a tool is shown in which the cutting edges are rounded through a honing step. The wear and tear on the tools is said to be thereby reduced.

BRIEF SUMMARY OF THE INVENTION

The object of the present invention thus consists in designing a milling tool for roughing workpieces in such a way that chipping in the region of the cutting edges and in particular in the crests of the profile of wave form can be prevented as much as possible, whereby measures taken to this end should call for as minimal an investment as possible.

This object is achieved according to the invention in that the bevel extends at least over the entire height of the crests of the profile of wave form, which bevel has a wedge angle that is more obtuse than the wedge angle of the milling tool.

This bevel in the profile of wave form can be very simply obtained by means of a single flat grinding step, in each case along the curved cutting edge, which can be achieved very cost-effectively. With the addition of this bevel, the wedge is reinforced, whereby the breaking off or chipping of the crest edges during the machining process, i.e. when roughing the workpiece, can be eliminated to a very great extent. A tool can thereby be obtained with which material removal may be carried out efficiently, and which is distinguished by high endurance.

The bevel is achieved in an advantageous way by a flat subsequent grinding of the crests, requiring an especially simple operation.

A further advantageous embodiment of the invention consists in the ground surface of the bevel having a lesser roughness than the surface of the flutes. This has the consequence that the machined off shavings are led away optimally.

The angle of rake of the flute advantageously lies in the range of 0° to −30°, preferably at about −25°. In this rake angle range, an optimal rate of material removal is achieved with at the same time a high endurance.

The milling tool is preferably made of carbide, whereby high rates of feed may be obtained.

An embodiment of the invention will be explained more closely in the following, by way of example, with reference to the attached drawing.

BRIEF DESCRIPTION OF THE SEVERAL VIEWS OF THE DRAWING(S)

Figure 2:
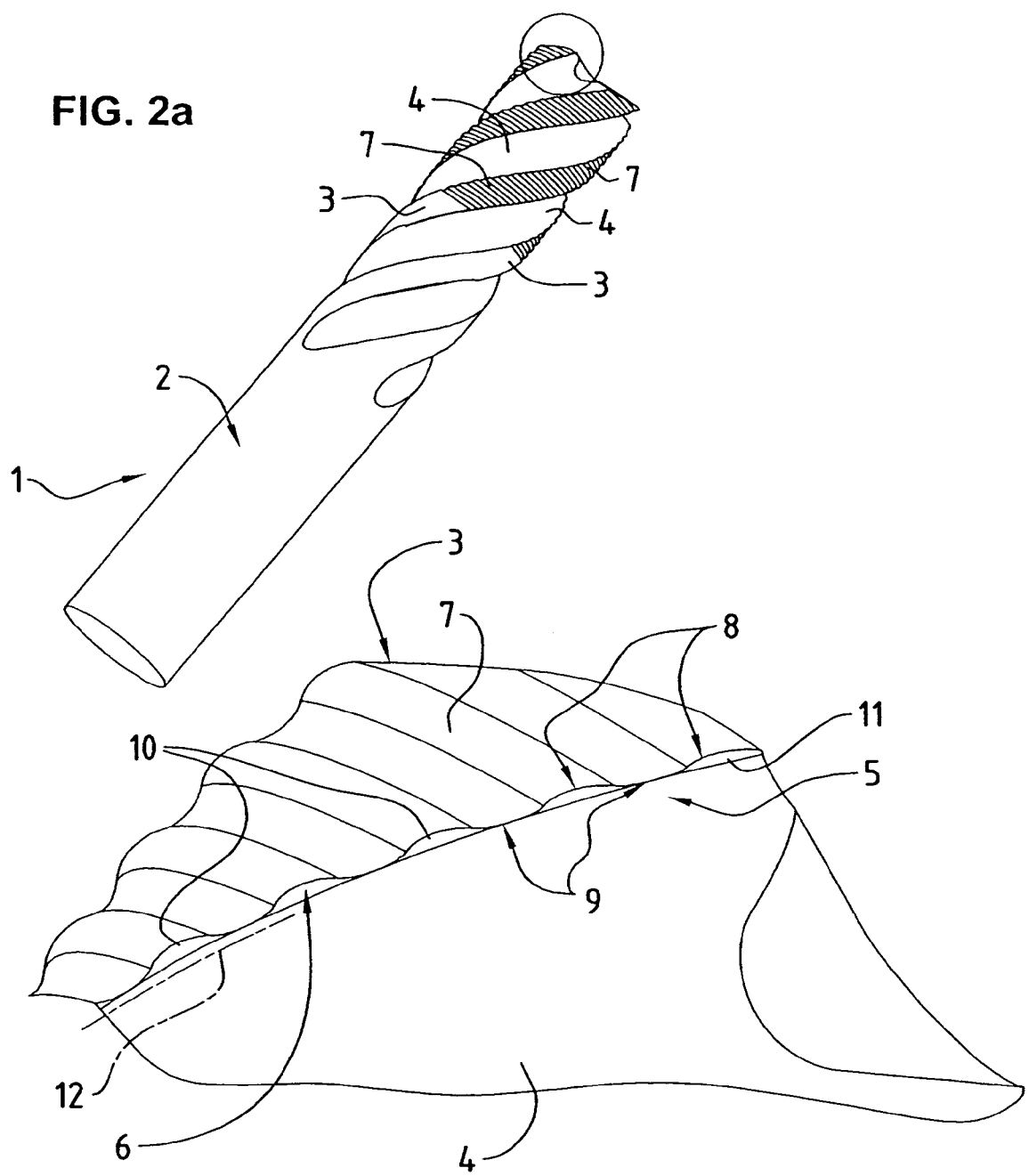
Figure 3:
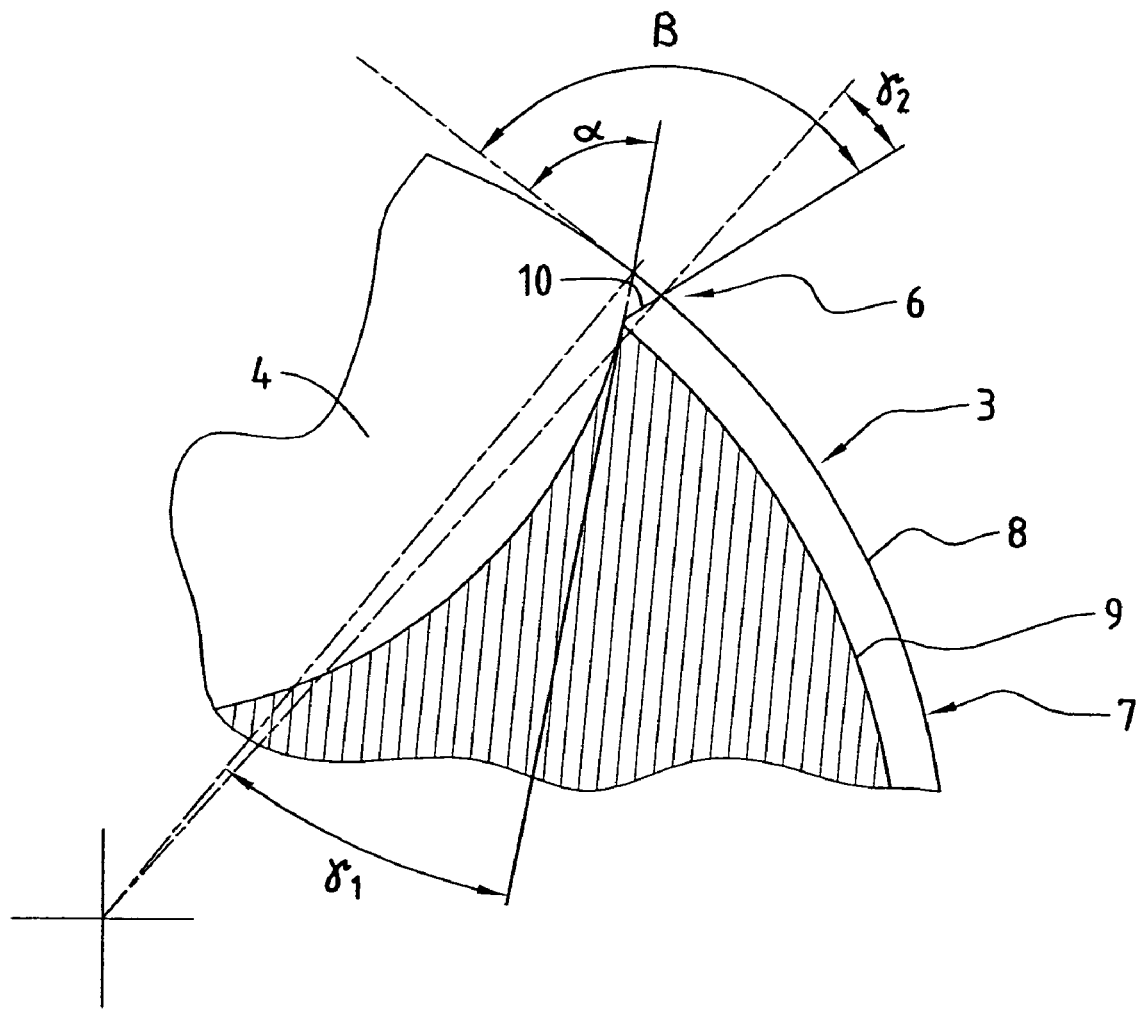

Shown are:

FIG. 1: a view of a milling tool according to the invention;

FIG. 2a: a spatial representation of this milling tool according to the invention;

FIG. 2b: an enlarged representation of the region of the milling tool according to the invention encircled in FIG. 2a; and FIG. 3: a partial view of the section along line A-A corresponding to the milling tool according to the invention shown in FIG. 1.

DETAILED DESCRIPTION OF THE INVENTION

Shown in FIG. 1 is a milling tool 1 for roughing workpieces comprising a cylindrical shank 2. This cylindrical shank 2 is provided in the lower region with flutes 4; situated between the flutes 4 are the cutting flanks 3. In a known way, the flutes 4 and hence the cutting flanks 3 are arranged in a helical fashion. The cutting flanks 3 are equipped on the cutting side 5 with cutting edges 6 that are provided with a predetermined rake angle. The cutting edges 6 have a profile of wave form 7 extending over the width b of the cutting flanks 3. Wave-form profiles of this kind are known by the designation "NRF", "NRC", "NR", "WRC" or "NF," for example.

This milling tool with the cylindrical shank 2 can be mounted in a known way in a corresponding machine tool; the workpiece can be subsequently machined using the rough milling procedure.

FIG. 2a shows the inventive milling tool of FIG. 1 in a spatial representation with the cylindrical shank 2, the cutting flanks 3, the flutes 4 and the profile of wave form 7. Shown enlarged in FIG. 2b is the region of the front zone of this tool 1 encircled in FIG. 2a.

Visible in this FIG. 2b is part of a cutting flank 3 on which the profile of wave form 7 extends. Part of a flute 4 can likewise be seen. Visible on the cutting side 5 of the cutting flank 3 shown here is the cutting edge 6. Owing to the profile of wave form 7, the cutting edge 6 has an undulant shape on the cutting flank 3, with crests 8 and troughs 9. In the region of the crests 8, a bevel 10 is cut, which will be described later in detail. Shown by the unbroken line 11 is the embodiment in which the bevel 10 extends over the entire height of the crests 8. Shown by the broken line 12 on the left side in FIG. 2b is the embodiment example in which the bevel width is selected to be larger than the height of the crests. The bevel base line is then situated below the troughs 9 in the flute 4.

From the sectional representation of FIG. 3, the flute 4 can be discerned in the cutout represented, as well as the cutting flank 3 with the cutting edge 6. Likewise visible is a crest 8 and a trough 9 of the profile of wave form 7 that extends over the entire cutting flank 3. Also visible in FIG. 3 is the bevel 10 with which the crests 8 are provided in the region of the cutting edge 6.

The rake angle $\gamma_1$ of the cutting flank of the milling tool if no bevel 10 were made can also be seen in FIG. 3. The angle $\gamma_2$ shows the rake angle of the bevels 10 provided on the crests 8. The wedge angle $\alpha$, which the milling tool has without the bevel being made, is likewise shown. In addition, the wedge angle $\beta$ which the tool forms with the cut bevel 10 is also visible. Therefore it can be perceived here that the wedge angle $\beta$ with the bevel 10 is more obtuse than the wedge angle $\alpha$ that the milling tool has without this beveling.

As can be seen from FIG. 2b, and in particular from FIG. 3, this bevel 10 can be produced with a single flat grinding step along the cutting edge 6. The surface of the bevel is hereby ground very finely in such a way that it usually has a lesser surface roughness than the surface of the flutes whereby an optimal sliding off is achieved of the shavings machined off on the workpiece. It is also conceivable for the surface roughness of the cut bevel surface and of the cut surface of the flutes to be practically the same and very minimal. Producing this bevel 10 is very easy and thus cost effective.

Achieved with this beveling of the crests is that the milling tool for roughing workpieces is reinforced at the cutting edges, which has the consequence that the otherwise commonly occurring chipping or breaking off, in particular in the region of the crest edges, is able to be substantially prevented. A milling tool is thereby obtained that is more efficient since the strains and stresses on the tool can be increased, and the tool can also be very simply and hence economically produced.

The invention claimed is:

1. A milling tool for roughing workpieces, the milling tool comprising a plurality of cutting flanks and flutes disposed in between, cutting sides of the cutting flanks with cutting edges having a predetermined rake angle, and the cutting edges have a profile of a wave form, the profile of the wave form including crests and troughs, the crests and troughs extending circumferentially about the milling tool across corresponding widths of the cutting flanks, and a bevel extending between the cutting edge defined by the crests and an angled edge, the angled edge extending between the troughs, or being positioned radially inward of the troughs with respect to a longitudinal axis of the milling tool, the bevel has a wedge angle which is more obtuse than a wedge angle of the milling tool.

2. The milling tool according to claim 1, wherein the bevel is achievable by way of a flat subsequent grinding of the crest.

3. The milling tool according to claim 1 wherein a cut surface of the bevel has less roughness than surfaces of the flutes.

4. The milling tool according to claim 2, wherein a cut surface of the bevel has less roughness than surfaces of the flutes.

5. The milling tool according to claim 1 wherein the rake angle of the bevel lies in a range of 0° to −30°.

6. The milling tool according to claim 2, wherein the rake angle of the bevel lies in a range of 0° to −30°.

7. The milling tool according to claim 3, wherein the rake angle of the bevel lies in a range of 0° to −30°.

8. The milling tool according to claim 4, wherein the rake angle of the bevel is about 25°.

9. The milling tool according to one of the claims 1 to 8, wherein the milling tool is made of carbide.

10. The milling tool according to claim 1, wherein the rake angle is about −25°.

11. The milling tool according to claim 1, wherein crests of the profile of the wave form are positioned radially outward of adjacent troughs of the profile of the wave form.

12. The milling tool according to claim 1, wherein at least one of the cutting edges has a variable radial height along a length of the at least one of the cutting edge, the variable radial height taken with respect to the longitudinal axis of the milling tool.

13. The milling tool according to claim 1, wherein at least one of the cutting edges extends helically about the longitudinal axis of the milling tool.

14. The milling tool according to claim 1, wherein the profile of the wave form extends in a substantially radial direction with respect to the longitudinal axis of the milling tool.

15. The milling tool according to claim 1, wherein the bevel extends at least over substantially an entire height of the crests of the profile of the wave form.

16. The milling tool according to claim 1, wherein the profile of the wave form has an undulating wave shape.

* * * * *